United States Patent Office 3,415,898
Patented Dec. 10, 1968

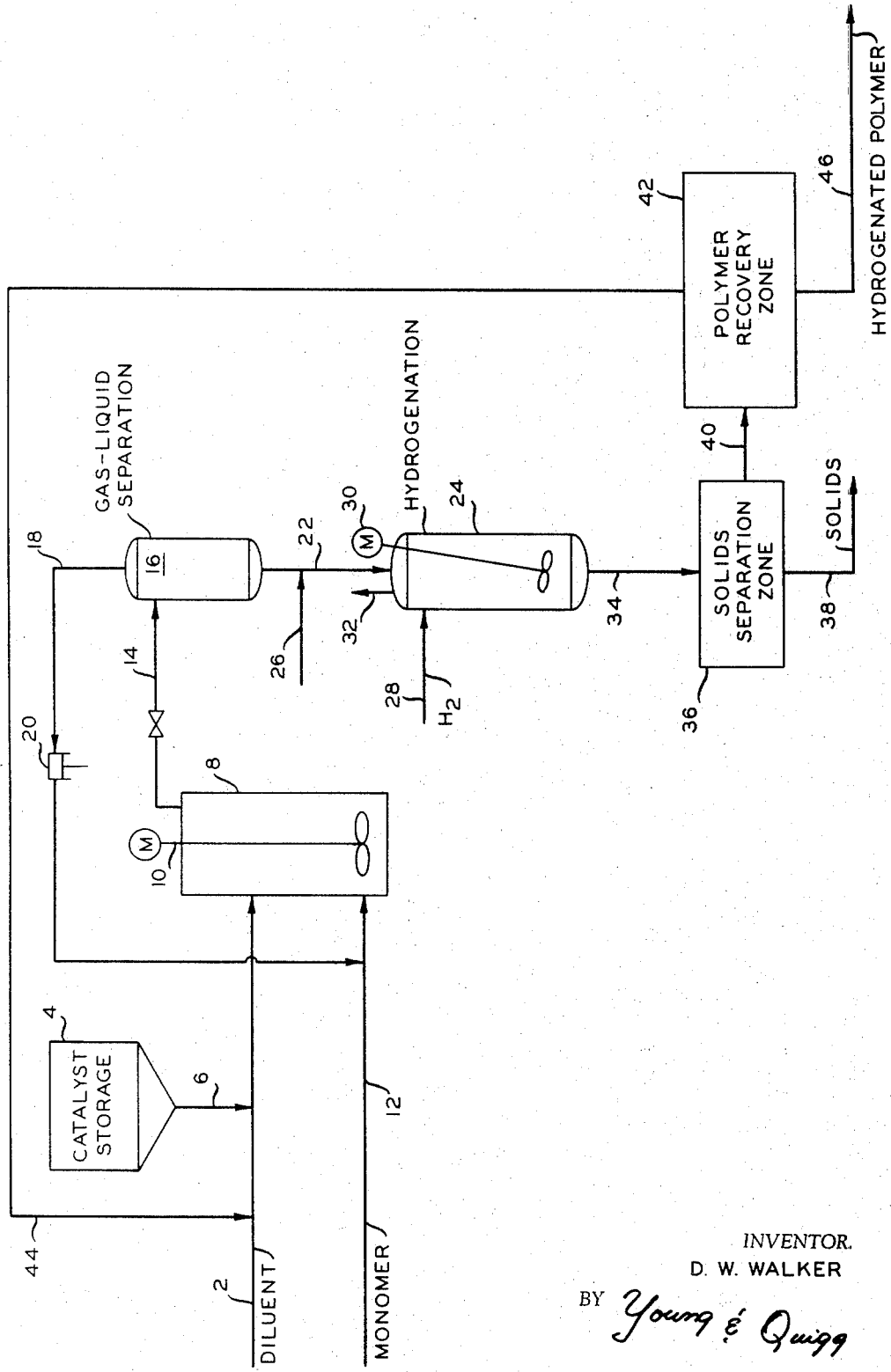

3,415,898
POLYOLEFIN HYDROGENATION PROCESS
Darrell W. Walker, Bartlesville, Okla., assignor to Phillips Petroleum Company, a corporation of Delaware
Filed Feb. 9, 1967, Ser. No. 614,900
6 Claims. (Cl. 260—683.9)

ABSTRACT OF THE DISCLOSURE

The total effluent, including supported chromium oxide-containing catalyst, from an olefin polymerization zone is combined with a nickelocene hydrogenation catalyst; this mixture is then hydrogenated in a hydrogenation zone; and the two catalysts are thereafter removed simultaneously from the effluent from the hydrogenation zone by a single filtration operation.

---

This invention relates to an improved process for the production of polyolefins containing reduced unsaturation. In one aspect this invention relates to an improved system for the hydrogenation of polyolefins whereby there is avoided the heretofore difficult catalyst removal procedures.

It has recently been found that the hydrogenation of 1-olefin polymers, such as polyethylene, greatly increases resistance to warpage in molding and also prevents melt index drop-off during extrusion. Consequently, various hydrogenation processes have been employed to achieve these results in 1-olefin polymers. For example, soluble catalyst systems employing organometals in conjunction with nickel salts have been used. Such processes, however, suffer from difficulties in the removal of the catalyst residues from the finished polymer. It is desirable to remove as much of the catalyst residue as possible. Since the removal of soluble catalyst components is difficult, solid hydrogenation catalysts have been tried. For example, catalysts such as Raney nickel or nickel oxide-silica catalyst have been used. These latter solid catalysts, however, are expensive and/or require expensive preparation and activation. Moreover, the continuous addition of solid materials to a reaction zone requires more complicated techniques.

It is thus an object of this invention to provide an improved process for the hydrogenation of 1-olefin polymers.

Another object of this invention is to provide a hydrogenation system for polymers of 1-olefins whereby there is avoided difficulties in separation of the hydrogenation catalyst from the finished polymer.

Other aspects, objects and the several advantages will become apparent from a consideration of this disclosure.

In accordance with the present invention, I have now discovered that when a solution of nickelocene (dicyclopentadienyl nickel) is added to the effluent of a 1-olefin polymerization reactor, which employs a chromium oxide-containing polymerization promoter, at a point after the residual 1-olefin monomer is removed, the resulting mixture can be hydrogenated to reduce the unsaturation present in the polymer and the dicyclopentadienyl nickel hydrogenation catalyst can be thereafter removed conveniently with the residual chromium oxide containing solid catalyst without having to previously separate the polymerization catalyst from the system. By my process an active nickel-containing hydrogenation catalyst is added to the effluent from the polymerization without the removal of the polymerization catalyst and is removed conveniently after hydrogenation from the polymer solution as a filterable solid utilizing the polymerization catalyst as a filter aid. This result is based upon the discovery that the nickelocene catalyst is adsorbed by the solid chromium oxide-containing catalyst and is thus removed through the conventional filtering procedures employed to remove the residual chromium oxide solid catalyst. This, in turn, is advantageous since there is avoided the necessity of having to remove the polymerization catalyst prior to the hydrogenation treatment.

The present invention is applicable to olefin polymerization effluents such as those described in U.S. 2,825,721, issued to J. P. Hogan and R. L. Banks and assigned to Phillips Petroleum Company. In general, ethylene or other 1-olefins, or a mixture of ethylene and one or more 1-olefin comonomers are contacted with a chromium oxide catalyst generally associated with at least one material selected from silica, alumina, zirconia, and thoria, and at least part of the chromium being in the hexavalent state at initial contact with the olefin monomer. The present invention is particularly advantageous when applied to the production of polyethylene over silica-containing chromium oxide catalysts.

The hydrogenation catalyst-component, nickelocene, is a known material which can be prepared by methods which are familiar in the art.

According to the process of this invention, nickelocene is added to the effluent of the 1-olefin polymerization reactor at a point after the residual olefin, such as ethylene, is flashed off but before the effluent is filtered. At this point sufficient nickelocene is added to give from about 0.001 to about 20, preferably 0.01 to 5.0, and still more preferably 0.1 to 0.5, weight percent of the organonickel compound based upon the weight of the chromium oxide-containing solid catalyst. The nickelocene can be added as a solution using any of the solvents which are suitable as a diluent for the polymerization reaction. After the nickel compound has been added, hydrogen is introduced while the mixture, preferably under agitation, is at a temperature in the range from about 200 to about 750° F., preferably 250 to about 575° F., and at pressures of 0 to about 5000 p.s.i.g. The contact time will vary over a wide range depending on the hydrogen pressure, amount of nickelocene present, the type of polymer, and the desired degree of hydrogenation. In many applications suitable hydrogenation is effected by contact times in the order of 0.1 minute to 3 hours.

After the hydrogenation reaction, any excess hydrogen is vented, and the catalyst-containing and hydrogenated polymer-containing mixture is subjected to conventional treatment and polymer recovery. That is, the mixture is filtered, the solvent is removed and recovered, and the polymer is extruded and dried.

As shown in the drawing, diluent, e.g., cyclohexane, enters through inlet 2 and is mixed with particulate chromium oxide catalyst supplied from storage vessel 4 through conduit 6. The suspension of catalyst in solvent passes to reactor 8 which is maintained by means of motor driven agitator 10 under turbulence effective to maintain the catalyst in suspension in the reaction mixture. Monomer, e.g., ethylene, enters the system through inlet 12 and is polymerized under polymerization conditions, e.g., 250° F. and 500 p.s.i. The catalyst supply rate can be varied over a broad range. Depending on the characteristics of the particular catalyst used and on the reaction conditions, from 0.01 to 10 parts by weight of catalyst per 100 parts by weight of monomer give satisfactory results in most cases. An effluent in the form of a slurry is removed from the reactor through line 14 and passed to gas-liquid separator 16 wherein unreacted ethylene and/or other gas is separated from the liquid phase and is recycled through conduit 18 and compressor 20. The nongaseous material is passed from gas-liquid separator 16 through conduit 22 to hydrogenator 24.

Conduit 22 is provided with inlet means 26 wherein nickelocene in an inert organic liquid is introduced directly into the effluent from gas-liquid separator 16. The resulting mixture is then introduced to hydrogenator 24 wherein hydrogen is introduced through inlet 28 while the mixture, preferably under agitation, is at a temperature in the range of from 200° to 750° F. Agitation is provided by motor driven stirrer 30, although other known agitation means can be used. Hydrogenation is effected by contacting the mixture with hydrogen for a contact time in the order of 0.1 minute to 3 hours. After the hydrogenation reaction, the excess hydrogen is vented through outlet 32, or alternatively removed by use of a gas-liquid separator (not shown), and the catalyst-containing and hydrogenated polymer-containing mixture is removed from hydrogenator 24 through line 34 and passed to solids separation zone 36, which can be a centrifuge, a filter, or other known equipment for the removal of solids from liquids at elevated temperatures and pressures. The catalyst is removed through outlet 38. The solution of polymer free of solids passes through conduit 40 to polymer recovery zone 42 wherefrom the treated polymer is recovered as a solid. Recovered diluent is recycled through conduit 44 and hydrogenated polymer product is recovered through outlet 46.

By the present invention, in addition to the effective hydrogenation provided by the nickelocene-promoted reaction, no additional separation problems are introduced. The soluble nickelocene has an affinity for the solid supported chromium oxide catalyst and will be adsorbed by it such that the same means for removing the solid chromium oxide catalyst from the product polymer will also accomplish nickel removal from the product polymer. A suitably hydrogenated and low ash-containing polymer is thus produced.

The invention can be further illustrated by the following example.

EXAMPLE I

Three identical polymerization runs were made with a silica-supported chromium oxide at 300° F., 450 p.s.i.g., in cyclohexene solvent, with a one-hour reaction time, and with each using the same type catalyst and reactor. The catalyst was a silica gel which contained, by impregnation, 0.7 weight percent chromium as the oxide. The catalyst was activated in flowing air about 16 hours at 1050° F. In all cases the stirred reactor was pressured to 450 p.s.i.g. with ethylene. The ethylene polymerized and at the end of about one hour the pressure had dropped to 85 p.s.i.g.

In the first reaction, the polymerization was carried out and the polymer recovered with no hydrogen treatment. This run established the typical unsaturation level of the polymer.

In the second run, hydrogenation at 300° F. was attempted for one hour after the polymerization period had ended but without the addition of any hydrogenation catalyst. The polymer resulting from this run was also recovered and showed that, without a hydrogenation catalyst, no reduction in polymer unsaturation was achieved.

In the third run, the invention run, the same procedure used for the first and second runs was used except that one cc. of 0.0137 molar solution of nickelocene in benzene was added to the reaction mixture which gave about a 3 weight percent nickelocene concentration based upon the amount of the solid chromium oxide catalyst present (about 22 p.p.m. of Ni based upon the weight of the polymer present). The results and conditions of this run as well as of the preceding two control runs are shown in the table below:

| Run | $SiO_2/CrO_3$, g. | Polymer, g. | Nickelocene, g. | $H_2$ partial pressure, p.s.i. | Unsaturation [1] | |
|---|---|---|---|---|---|---|
| | | | | | Internal | Terminal |
| 1 | 0.0859 | 33.5 | None | None | 0.0 | 1.0 |
| 2 | 0.0856 | 20.4 | None | 120 | 0.0 | 1.3 |
| 3 | 0.0827 | 27.3 | 0.0026 | 156 | [2] 0.2 | 0.1 |

[1] Unsaturation per 1,000 carbon atoms determined by infrared analysis.
[2] This figure believed to be a maximum. The IR peak was too small for accurate determination.

The data clearly show the effectiveness of the nickelocene for polymer hydrogenation.

Reasonable variations and modifications are possible within the scope of this disclosure without departing from the spirit and scope of the invention.

I claim:

1. In a process for the production of hydrogenated polyolefins which comprises the steps of (A) polymerization of at least one polymerizable olefin with a catalyst active for such polymerization and comprising, as the sole essential effective catalytic ingredients thereof, chromium oxide and at least one material selected from the group consisting of silica, alumina, zirconia, and thoria, at least part of the chromium being in the hexavalent state at the initial contacting of hydrocarbon with said catalyst and (B) hydrogenation of the resulting polymerized olefin, the improvement which comprises using as a catalyst for said hydrogenation dicyclopentadienyl nickel in the presence of the catalyst from said polymerization step.

2. A process according to claim 1 wherein catalyst composite for said hydrogenation is formed in situ by the addition of dicyclopentadienyl nickel in an inert organic liquid to a stream containing polymerized olefin and catalyst residue from said polymerization step.

3. A process according to claim 1 wherein dicyclopentadienyl nickel is added in an amount to give from about 0.001 to about 20 weight percent thereof based upon the weight of the catalyst residues.

4. A process according to claim 1 wherein said catalyst residue comprises silica-supported chromium oxide.

5. A process according to claim 1 wherein said hydrogenation step is carried out at a temperature in the range of 200° to 750° F. and at a pressure in the range of 0 to 5000 p.s.i.g.

6. A process according to claim 1 wherein said polymerizable olefin is ethylene.

No references cited.

DELBERT E. GANTZ, *Primary Examiner.*

H. LEVINE, *Assistant Examiner.*

U.S. Cl. X.R.

260—94.9